United States Patent
Muyzert et al.

(10) Patent No.: US 9,013,952 B2
(45) Date of Patent: Apr. 21, 2015

(54) MARINE SEISMIC SURVEY SYSTEMS AND METHODS USING AUTONOMOUSLY OR REMOTELY OPERATED VEHICLES

(75) Inventors: Everhard Muyzert, Girton (GB); Kenneth Welker, Nesoya (NO); Iain Cooper, Sugar Land, TX (US); Simon Bittleston, Newmarket (GB); Leendert Combee, Sanddvika (NO); Robert Ross, St. Nom la Breteche (FR); Edward Kotochigov, North Fetcham (GB)

(73) Assignee: WesternGeco L.L.C., Houston, TX (US)

( * ) Notice: Subject to any disclaimer, the term of this patent is extended or adjusted under 35 U.S.C. 154(b) by 412 days.

(21) Appl. No.: 13/209,250

(22) Filed: Aug. 12, 2011

(65) Prior Publication Data

US 2012/0069702 A1    Mar. 22, 2012

Related U.S. Application Data

(60) Provisional application No. 61/383,940, filed on Sep. 17, 2010, provisional application No. 61/413,217, filed on Nov. 12, 2010, provisional application No. 61/440,136, filed on Feb. 7, 2011.

(51) Int. Cl.
*G01V 1/38* (2006.01)

(52) U.S. Cl.
CPC ............ *G01V 1/3843* (2013.01); *G01V 1/3808* (2013.01)

(58) Field of Classification Search
CPC ......... G01V 1/38; G01V 1/3808; G01V 1/04; G01V 1/3843
USPC ........................................................ 367/15
See application file for complete search history.

(56) References Cited

U.S. PATENT DOCUMENTS

| | | | |
|---|---|---|---|
| 4,992,992 A * | 2/1991 | Dragoset, Jr. | 367/21 |
| 5,052,814 A | 10/1991 | Stubblefield | |
| 5,224,105 A * | 6/1993 | Higley | 714/748 |
| 5,668,775 A * | 9/1997 | Hatteland | 367/19 |
| 5,894,450 A * | 4/1999 | Schmidt et al. | 367/134 |
| 6,028,817 A | 2/2000 | Ambs | |
| 6,285,956 B1 * | 9/2001 | Bennett et al. | 702/14 |
| 6,474,254 B1 * | 11/2002 | Ambs et al. | 114/312 |
| 6,588,980 B2 * | 7/2003 | Worman et al. | 405/158 |
| 6,906,981 B2 | 6/2005 | Vaage | |
| 6,975,560 B2 * | 12/2005 | Berg et al. | 367/16 |
| 7,371,136 B2 | 5/2008 | Hine et al. | |
| 7,411,863 B2 * | 8/2008 | Toennessen | 367/20 |
| 7,796,466 B2 | 9/2010 | Combee et al. | |
| 2009/0231953 A1 * | 9/2009 | Welker et al. | 367/19 |

(Continued)

FOREIGN PATENT DOCUMENTS

| | | | | |
|---|---|---|---|---|
| WO | WO 8704401 A1 * | 7/1987 | | B63H 19/02 |
| WO | WO 9410029 A1 * | 5/1994 | | B63H 19/02 |

OTHER PUBLICATIONS

International Search Report and Written Opinion of PCT Application No. PCT/US2011/047791 dated Mar. 26, 2012.

*Primary Examiner* — Ian J Lobo (57) ABSTRACT

Systems and methods for carrying out seismic surveys and/or conducting permanent reservoir monitoring with autonomous or remote-controlled water vehicles, including surface and submersible vehicles, are described. Additional methods carried out by autonomous or remote-controlled water vehicles and associated with seismic surveys further described.

21 Claims, 7 Drawing Sheets

(56) References Cited

U.S. PATENT DOCUMENTS

| | | | |
|---|---|---|---|
| 2010/0153050 A1* | 6/2010 | Zumberge et al. | 702/92 |
| 2010/0157727 A1* | 6/2010 | Woodard et al. | 367/15 |
| 2010/0182870 A1* | 7/2010 | Norris et al. | 367/15 |
| 2010/0226204 A1* | 9/2010 | Gagliardi et al. | 367/16 |
| 2011/0205839 A1* | 8/2011 | Sudow et al. | 367/20 |

* cited by examiner

MARINE SEISMIC SURVEY SYSTEMS AND METHODS USING AUTONOMOUSLY OR REMOTELY OPERATED VEHICLES

CROSS-REFERENCE TO RELATED APPLICATIONS

This application claims the benefit of U.S. Provisional Patent Application Nos. 61/440,136, filed on Feb. 7, 2011; 61/413,217, filed on Nov. 12, 2010; and 61/383,940, filed on Sep. 17, 2010, all of which are hereby incorporated by reference in their entirety.

TECHNICAL FIELD

The present disclosure relates in general to marine seismic data acquisition, and more particularly to systems and methods for conducting seismic surveys and performing activities related to seismic surveys using autonomously operated vehicles (AOVs) and/or remotely operated vehicles (ROVs).

BACKGROUND

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Marine seismic surveys may be carried out in a variety of manners. For example, towed array surveys are quite popular and involve the use of one or more large vessels towing multiple seismic streamers and sources. Streamers can be over 10 km long and contain a large number of closely spaced hydrophones and possibly also particle motion sensors, such as accelerometers.

Another method for acquiring seismic data involves the deployment of seismic nodes at the seafloor. Such nodes may contain a pressure sensor, a vertical geophone and two orthogonal horizontal geophones as well as a data recorder and battery pack. Nodes may be deployed by an ROV or simply deployed off the back of a ship.

SUMMARY

The present disclosure is directed to the use of AOVs and/or ROVs for conducting seismic surveys and/or performing other activities related to seismic data acquisition. Exemplary AOVs and/or ROVs that may be used in carrying out the principles of the present disclosure are already available in the marketplace and may include one or more of the following: the wave Glider® provided by Liquid Robotics, Inc. and further described in U.S. Pat. No. 7,371,136, which is hereby incorporated by reference, the Slocum™ diver provided by Teledyne Webb Research and further described at http://www.webbresearch.com/slocumglider.aspx, and the uRaptor™ Twin TVC UAV provided by Goscience and further described at http://www.goscience.co.uk/index.html.

The AOVs and/or ROVs contemplated within the present disclosure may be outfitted with a seismic streamer carrying one or more seismic sensors. Such sensors may include pressure sensors, e.g., hydrophones, and particle motion sensors, such as accelerometers. The streamer may be deployed in a conventional manner and thus towed horizontally through the water column, or in some embodiments, the streamer may depend vertically through the water column. The AOVs and/or or ROVs and associated streamers may be used for permanent reservoir monitoring.

In addition to conducting seismic surveys, the AOVs and/or ROVs may be used to carry out other activities related to the acquisition of seismic data. For example, the AOVs and/or ROVs may be utilized to take current measurements, to position seismic survey equipment, to perform sound verification studies and/or monitor the presence of marine mammals.

The foregoing has outlined some of the features and technical advantages of the present disclosure in order that the detailed description that follows may be better understood. Additional features and advantages of the present disclosure will be described hereinafter which form the subject of the claims.

BRIEF DESCRIPTION OF THE DRAWINGS

The foregoing and other features and aspects of the present disclosure will be best understood with reference to the following detailed description of a specific embodiment of the invention, when read in conjunction with the accompanying drawings, wherein.

DETAILED DESCRIPTION

Refer now to the drawings wherein depicted elements are not necessarily shown to scale and wherein like or similar elements are designated by the same reference numeral through the several views.

Figure 1:
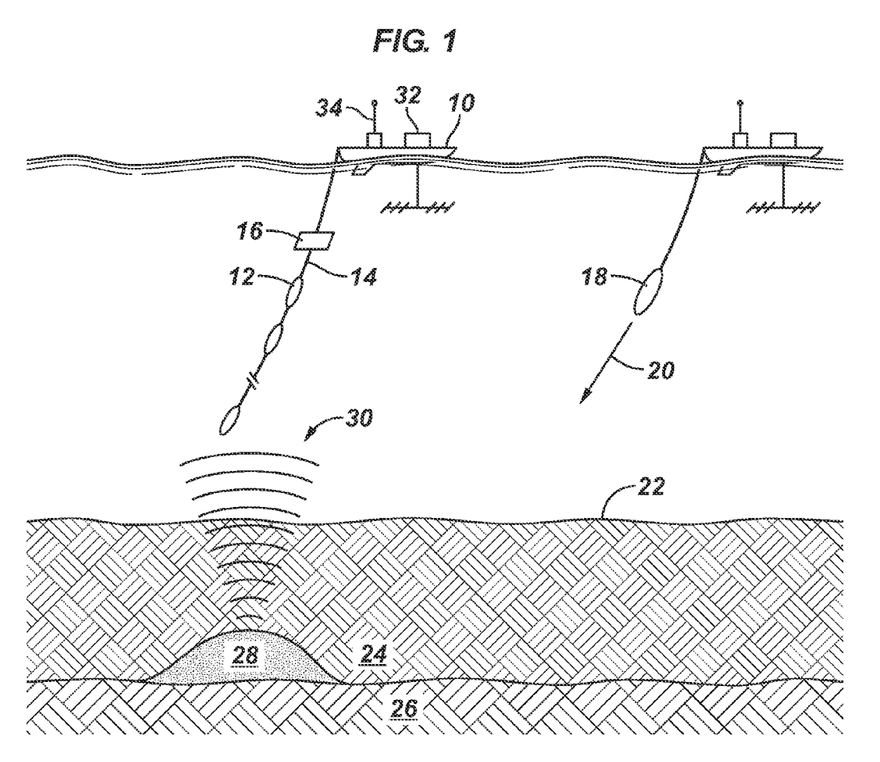
FIG. 1 is a schematic diagram of a marine seismic data acquisition system according to an embodiment of the disclosure.

Referring to FIG. 1, a water vehicle 10 may take the form of an AOV or ROV. In some embodiments, the water vehicle 10 may be adapted to descend through the water column, while in other embodiments, the water vehicle may be adapted only for use on the sea surface. In the embodiment depicted in FIG. 1, the vehicle 10 takes the form of a wave glider, which harnesses wave energy to impart motion to the glider. Additional details regarding operation of the wave glider are disclosed in U.S. Pat. No. 7,371,136, which is incorporated herein by reference. According to principles of the present disclosure, the wave glider platform may be used for seismic surveying and thus is instrumented with at least one seismic sensor 12. The sensor 12 may be located on the wave glider, or towed behind it with a tether, or inside a hydrodynamic body coupled to the wave glider, such as a streamer 14. In the embodiment depicted in FIG. 1, the streamer 14 may depend in a substantially vertical manner from the wave glider into the water column. In other embodiments, the streamer 14 may be substantially horizontal within the water column, while in still other embodiments, the streamer may take on a slanted or undulating configuration. The streamer 14 is preferably shorter than conventional streamers.

In accordance with embodiments of the disclosure, the seismic sensors 12 may be pressure sensors only, particle motion sensors only, or may be multi-component seismic sensors. For the case of multi-component seismic sensors, the sensors are capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components) of a particle velocity and one or more components of a particle acceleration.

Depending on the particular embodiment of the disclosure, the multi-component seismic sensors may include one or more geophones, hydrophones, particle displacement sensors, optical sensors, particle velocity sensors, accelerometers, pressure gradient sensors, or combinations thereof. For example, in accordance with some embodiments of the disclosure, a particular multi-component seismic sensor may include three orthogonally-aligned accelerometers (e.g., a three-component micro electro-mechanical system (MEMS) accelerometer) to measure three corresponding orthogonal components of particle velocity and/or acceleration near the seismic sensor. In such embodiments, the MEMS-based sensor may be a capacitive MEMS-based sensor of the type described in co-pending U.S. patent application Ser. No. 12/268,064, which is incorporated herein by reference. Of course, other MEMS-based sensors may be used according to the present disclosure. In some embodiments, a hydrophone for measuring pressure may also be used with the three-component MEMS described herein.

It is noted that the multi-component seismic sensor may be implemented as a single device or may be implemented as a plurality of devices, depending on the particular embodiment of the disclosure. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

In the embodiment of FIG. 1, the streamer 14 takes the form of a vertical cable, i.e., a streamer that extends substantially vertically through the water column. See, e.g., U.S. Pat. No. 4,694,435, which is incorporated herein by reference. In this embodiment, the water vehicle 10 may maintain a stationary position while recording seismic data via the seismic sensors 12. The position of the water vehicle 10 may be geographically stationary or, alternatively, the water vehicle and the cable 14 may drift with the currents. The length of the vertical cable 14 may vary between less than a meter to over a kilometer. Vertical cables may be much thinner than conventional towed streamers, thus facilitating ease of handling.

The vertical cables 14 of the present disclosure may be modified in various manners to improve performance. For example, fairings 16 may be employed to reduce cross-flow noise due to currents and drag. Also, the vertical cables 14 may be formed of fiber optic cables and/or cables with fiber optic sensors may be employed, thus resulting in a lighter and thinner cable relative to conventional streamer cables. Still further, accelerometers capable of measuring the gravity vector may be used to measure the tilt of the streamer 14 relative to the vertical.

In practice, the water vehicle 10 may be deployed to a desired position for seismic surveying. Upon positioning, a seismic source 18 may be detonated to generate acoustic waves 20 that propagate through an ocean bottom surface 22 and into strata 24, 26 beneath the ocean bottom surface. The seismic source 18 may depend from another water vehicle 10 (as shown in FIG. 1), or more conventional source deployments may be used, such as the use of dedicated source vessels. The acoustic signals 20 are reflected from various subterranean geological formations, such as an exemplary formation 28 depicted in FIG. 1. The incident acoustic signals 20 produce corresponding reflected acoustic signals, or pressure waves 30, which are sensed by the seismic sensors 12. The seismic sensors 12 generate signals (digital signals, for example), called "traces," which indicate the acquired measurements of the pressure wavefield and particle motion (if the sensors include particle motion sensors). The traces are recorded and may be passed to a signal processing unit 32 disposed on the water vehicle 10. Of course, the signal processing unit 32 may be disposed on another vessel participating in the survey. The signal processing unit 32 may include a digitizer and memory for storing seismic data acquired during the survey. The water vehicle 10 may further include an onboard communication unit 34, which may communicate with a base station located onshore or at sea, such as on a rig or vessel. The communication unit 34 may be used to transmit water vehicle position, quality control parameters, time information and seismic data. The communication unit 34 may also send or receive commands particular to the seismic survey. Such commands may include redirecting the water vehicles 10 for purposes of infill.

Figure 2:
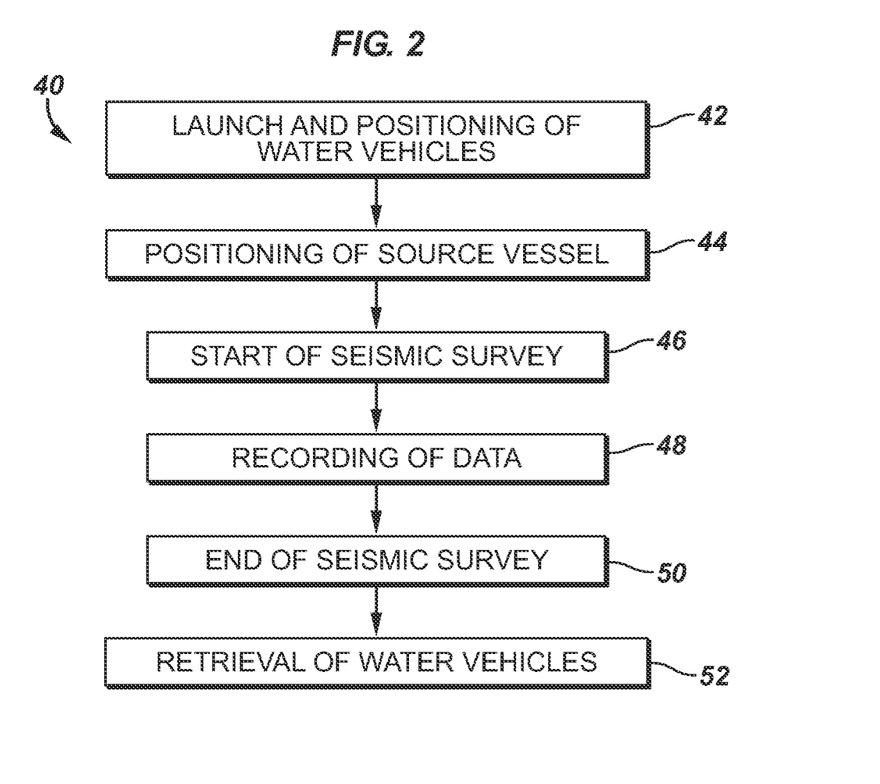
FIG. 2 is a flowchart depicting a method for performing a seismic survey according to an embodiment of the disclosure.

Once sufficient data has been collected for a particular position, the water vehicle 10 may be instructed to then move to a new survey position. The rapid deployment and re-deployment enabled through use of the water vehicle provides efficiency gains in acquiring seismic data. In some embodiments, the water vehicles 10 may be launched from a seismic source vessel, which tows one or more gun arrays for generating seismic signals. Referring to FIG. 2, a workflow 40 for conducting a seismic survey includes the steps of: launching and positioning of water vehicles in a survey region 42; positioning the source vessel 44; starting a seismic survey 46; recording seismic data 48; ending the seismic survey 50; and retrieving the water vehicles 52.

Figure 3A:
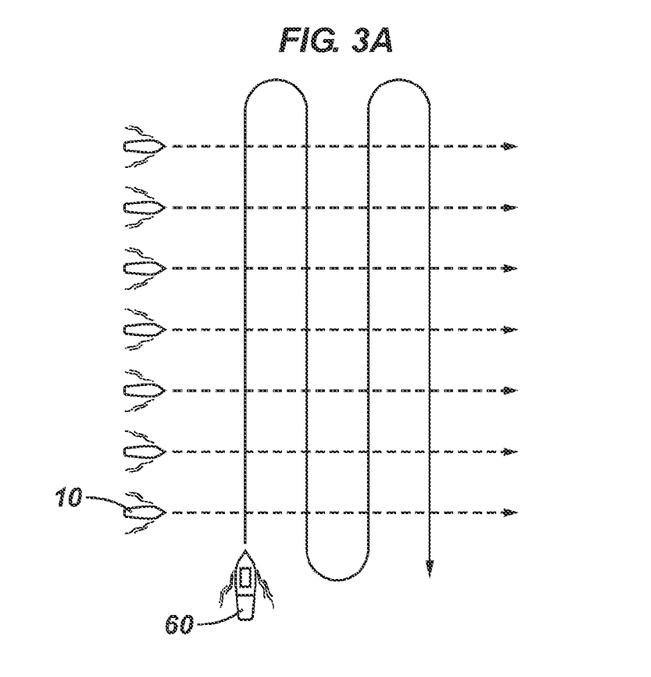
FIGS. 3A-3D are schematic diagrams of seismic survey arrangements according to embodiments of the disclosure.

Several seismic survey geometries may be employed via the workflow using the water vehicles 10 as seismic data acquisition platforms. For example, FIG. 3A depicts a survey geometry in which the water vehicles 10 advance along a substantially linear path, while a source vessel 60 shoots along a sail pattern that is substantially perpendicular to the paths of the water vehicles. It is to be appreciated that in practice, the water vehicles 10 do not travel along a substantially linear path, but rather there is likely some deviation from the linear path. The water vehicles 10 preferably have spacing similar to towed streamers, such as 100 meter intervals in the crossline direction. The water vehicles 10 may move at a speed (e.g., 1 knot or less) considerably different from the source vessel (e.g., 5 knots or more). This not only facilitates the survey geometry, but also allows the smaller water vehicles 10 to conserve more fuel relative to the faster and larger source vessel 60. When the source vessel 60 has reached a boundary of the area under survey, it may turn around and continue shooting along a line perpendicular to the water vehicles' 10 sail direction.

Figure 3B:
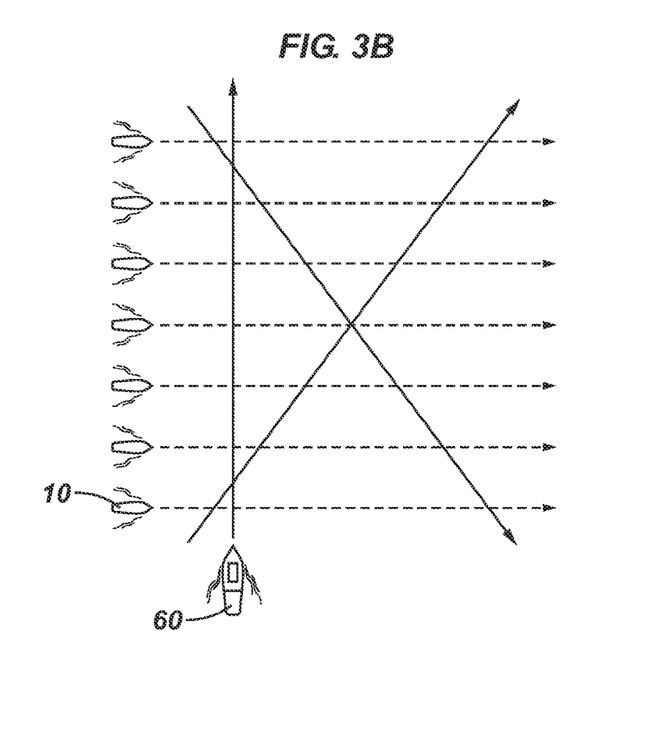
Figure 3C:
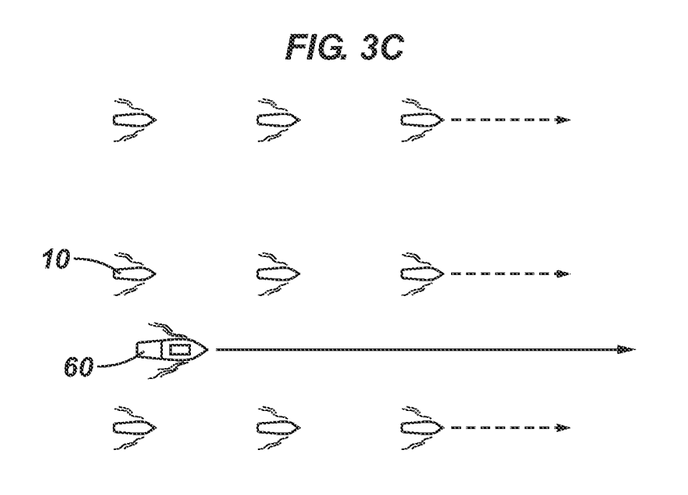
Figure 3D:
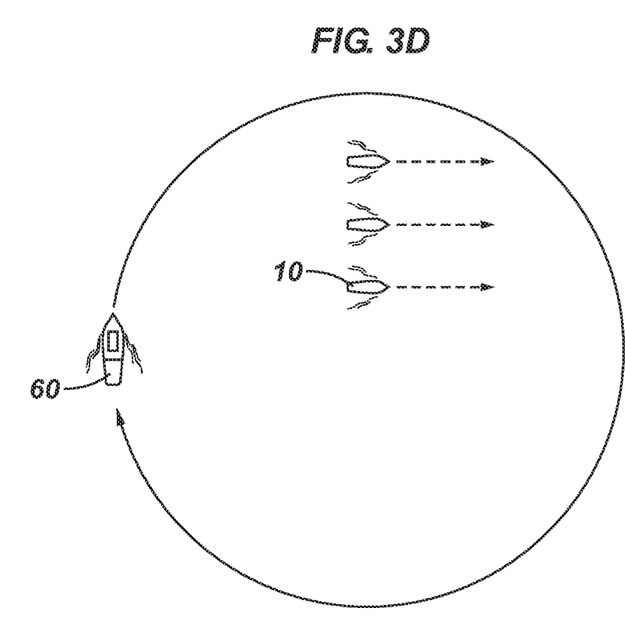

FIG. 3B illustrates another possible geometry in which the water vehicles 10 advance along a substantially linear path, while the source vessel 60 shoots along a path either perpendicular or generally transverse to the water vehicles' path. FIG. 3C illustrates yet another possible geometry in which the source vessel 40 shoots along a path substantially parallel to the path of the water vehicles 10. FIG. 3D illustrates another geometry in which the source vessel 60 shoots in a substantially circular configuration in and around a survey area of the water vehicles 10. Elliptical configurations are also contemplated. At the conclusion of the seismic survey, the source vessel 40 may collect the water vehicles 10 to permit data retrieval and recharging of the water vehicles, if necessary.

To facilitate seismic surveying, the water vehicles 10 may have an onboard positioning system. This may include conventional GPS systems for surface units and/or short base line acoustic positioning systems for positioning the streamer 14 (FIG. 1) relative to the water vehicle 10. Other positioning systems may utilize one or more compasses with or without accelerometers to determine streamer shape and location relative to the water vehicle 10.

Multiple AUV's may employ relative positioning methods such as RTK or acoustic distance measuring systems. Radar positioning methods might also be used, with a master vessel or platform using micro-radar systems for locating one or more gliders relative to its known positing.

Figure 4:
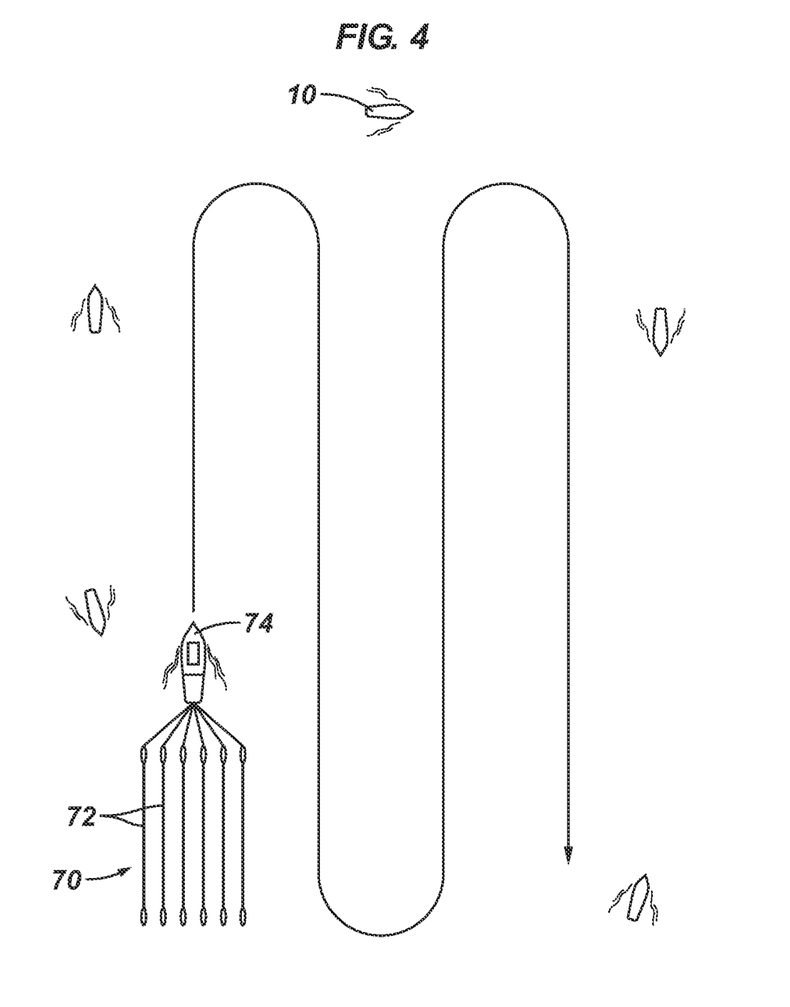
FIG. 4 is a schematic diagram of yet another seismic survey arrangement according to an embodiment of the disclosure.

Referring to FIG. 4, in some embodiments, the water vehicles 10 may be deployed together with a conventional towed array seismic survey system 70 in which conventional seismic streamers 72 are towed through the water column to collect seismic data. In such embodiments, the water vehicles 10 may provide support by collecting and providing data useful for facilitating operation of the seismic survey. For example, the water vehicles 10 may be used for measuring current in real time using an ADCP or other current measurement device, or alternatively comparing its speed over ground to a water speed measurement. Such current data may be transmitted to a conventional survey vessel 74 (e.g., via communication unit 32 (FIG. 1)) operating in the area to allow the vessel to anticipate the current velocity it might encounter while traversing down a survey line. Knowledge of the current ahead can be used to control the vessel speed and rudder, and streamer and source steering devices, allowing a smooth transition from one current regime to the next.

The water vehicles 10 according to the present disclosure may also be used with conventional towed arrays to aid in positioning of the streamers 72. In such embodiments, the water vehicles 10 may provide one or more Global Navigation Satellite Systems (GNSS) Earth Centered Earth Fixed (ECEF) reference points. For example, the water vehicles 10 may be equipped with GPS devices. The deployed streamers 72 may be equipped with acoustic positioning systems, such as the IRMA system described in U.S. Pat. No. 5,668,775, which is hereby incorporated by reference. Sensors in or on the streamers may be positioned with respect to a short baseline (sbl) or ultra short baseline (usbl) transducer head mounted on the wave glider platform with reference to the GNSS antenna. To further improve the position accuracy of the streamers 72, the water vehicles 10 in the survey area may become part of the acoustic positioning system. In this regard, the water vehicles 10 may record the acoustic signals emitted by the acoustic sources in the streamers 72 and transmit those recordings to the vessel 74. The water vehicles 10 may also carry additional acoustic sources whose signals are recorded by the streamers 72. The recorded acoustic signals from the streamers 72 and the water vehicles 10 may then be combined and used to determine an even more accurate position of the streamers and the water vehicles. In some embodiments, the water vehicles 10 may be deployed within the spread of streamers 72 if risk of entanglement is low. Otherwise the water vehicles may sail outside the streamer spread as illustrated in FIG. 4.

Figure 5:
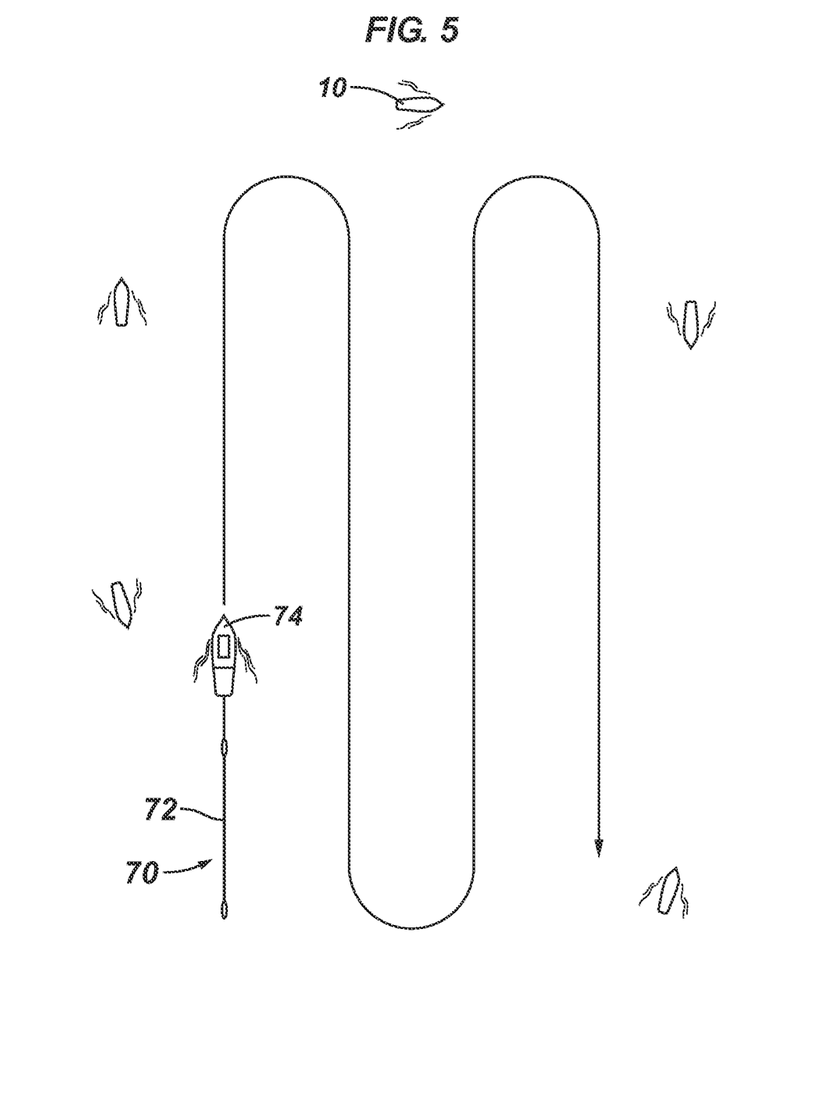
FIG. 5 is a schematic diagram of yet another seismic survey arrangement according to an embodiment of the disclosure.

Referring to FIG. 5, in some embodiments, the water vehicles 10 may be deployed in conjunction with a 2D seismic survey in which only one streamer 72 is towed behind the vessel 74. In such surveys, obtaining accurate position information is more challenging. Prior art solutions involve measuring the streamer orientation at regular intervals using compasses inside the streamer. According to the principles of the present disclosure, the water vehicles 10 may be deployed with acoustic positioning equipment as previously described and at a position offset from the sail line of the streamer 72. The acoustic positioning equipment on the water vehicles 10 is able to both receive and transmit acoustic signals. Accordingly, methods of triangulation may be used to accurately determine streamer position and shape. This more accurate streamer position information may be used to determine the further course of the vessel and streamer and for correcting to such position. The streamer 72 may also be fitted with steerable birds that when combined with new position information would allow for more accurate positioning of the streamer in response to currents and feathering.

Figure 6:
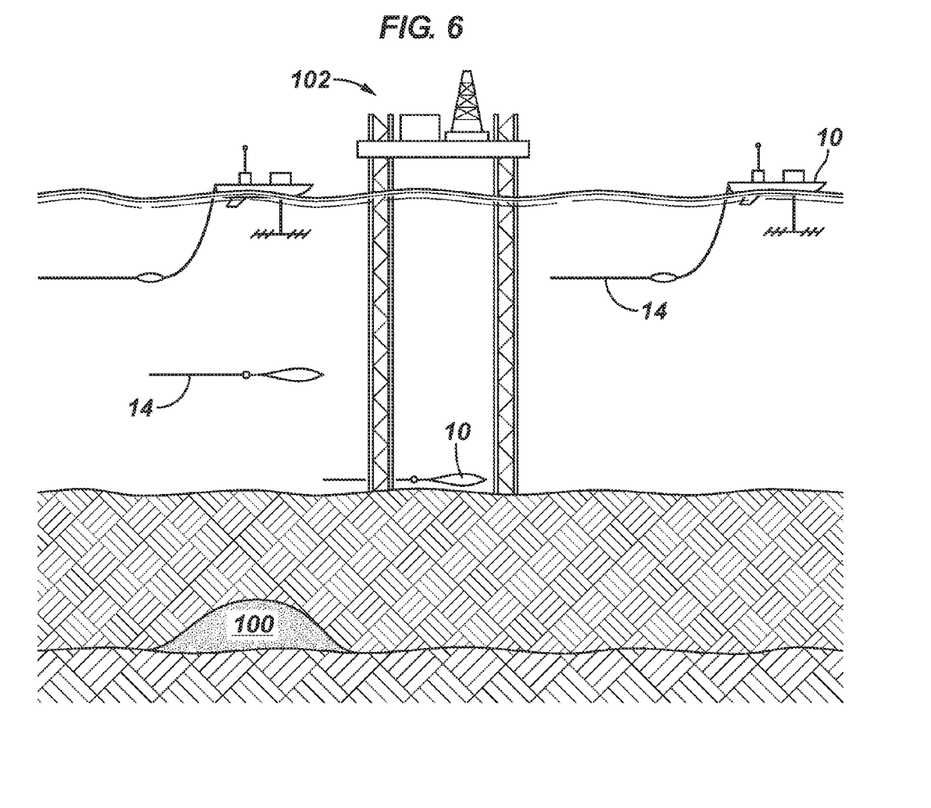
FIG. 6 is a schematic diagram of a permanent reservoir monitoring arrangement according to an embodiment of the disclosure.

In still other embodiments, and with reference to FIG. 6, one or more water vehicles 10 may be deployed in the vicinity of a known oil and/or gas reservoir 100 and associated drilling rig 102 for the purposes of monitoring the reservoir. Reservoir monitoring is a common practice in the oilfield industry to assess the continued viability of the reservoir. However, conventional towed array systems are ill-equipped to provide reservoir monitoring as the length and size of such spreads can interfere with the drilling rig and associated supply vessels operating in the area. According to the principles of the present disclosure, several water vehicles 10 may be deployed with associated mini-streamers 14. Such vehicles 10 allow for closer deployment to the survey region of interest (e.g., reservoir 100) and also reduce risks associated with streamer entanglement. Indeed, in embodiments where the water vehicles 10 are designed to ascend and descend within the water column, risk of entanglement or collision with the rig 102 and/or supply vessels may be further mitigated.

Also, a combination of surface vehicles 10 and underwater vehicles 10 may be simultaneously deployed for the purposes of permanent reservoir monitoring. For example, the surface vehicles 10 may be deployed in a vertical cable arrangement as shown in FIG. 1, while the underwater vehicles 10 may provide infill coverage complementary to the surface vehicles. In such embodiments, the underwater vehicles 10 may tow streamers in a substantially horizontal direction, or the seismic sensors may be coupled to the underwater vehicle itself, thus eliminating the need for streamers. Of course, other complementary geometries are contemplated, such as using the surface vehicles 10 to tow substantially horizontal streamers, while the underwater vehicles 10 record seismic data (with or without streamers) in a substantially vertical direction in the water column.

The vehicles 10 may be deployed in conjunction with an energy source that provides useful data for seismic purposes.

For example, such an energy source may include a seismic source (e.g., seismic source 18 in FIG. 1), drilling induced acoustic pressure waves, or production induced acoustic pressure waves such as might result from water or gas injection. In embodiments where seismic sources are deployed with the water vehicles 10, the seismic source may be a conventional air gun, marine vibrator, or non-traditional environmentally friendly source. Marine vibrators and non-conventional environmentally friendly sources are characterized in that they have a lower amplitude than conventional airguns. The seismic sensors towed by, or otherwise coupled to, the water vehicles 10 are better suited for recording lower amplitudes due to the low water relative speeds of the water vehicles that avoid the water flow induced pressure waves that impact the hydrophones of conventional towed array systems. Further, the water vehicles 10 are better suited for recording the lower amplitude drilling and production induced noise produced in the vicinity of the reservoir 100. The combination of the relatively quiet towing platform of the water vehicles 10 and seismic signal emission without the need for a source towing vessel is a significant efficiency gain for reservoir monitoring. Such seismic monitoring could be performed continuously during the life of the reservoir to calibrate reservoir models and generally give information that will increase production.

In some embodiments, the water vehicle 10 may be used to monitor the presence of marine mammals in an area where seismic source signals are being generated. The hydrophones 12 towed by the water vehicles 10 may be used to record data in two separate sampling frequencies—one being a survey sampling frequency associated with acoustic signals emitted by the seismic source, and the other being a detection sampling frequency associated with marine mammal vocalizations. Additional details regarding such a marine mammal detection system are further described in U.S. Patent Publication No. 2010/0067326, which is hereby incorporated by reference. In other embodiments, the water vehicles 10 and associated mini-streamers 14 may be dedicated to marine mammal monitoring and thus the sensors 12 are designed for and used exclusively to detect marine mammal vocalizations. In still other embodiments, the streamers contain sensors designed for seismic signal recording and additional specially designed marine mammal sensing devices together.

In still other embodiments, the water vehicles 10 may be deployed to engage in sound verification studies to assess the zone of impact associated with firing of seismic sources during the survey. Such studies are typically performed prior to the start of a seismic survey and are aimed at calculating a zone of impact based on numerical models for the survey area, including water depth, ocean bottom properties and water properties. By assessing the zone of impact, the area may be cleared prior to beginning the seismic survey. The assessed zone of impact may be verified by shooting a line into an array of hydrophones disposed substantially perpendicular to the shooting line. Thus, measurements at different offsets may provide the desired verification. The array of hydrophones may be deployed via the water vehicles 10, thus obviating the need for deploying more costly chase and/or supply vessels to perform the sound verification studies. Moreover, given the relatively small surface area of the water vehicles 10, such verification studies may be performed in real time, thus avoiding delays of the start of the seismic survey.

Although specific embodiments of the invention have been disclosed herein in some detail, this has been done solely for the purposes of describing various features and aspects of the invention, and is not intended to be limiting with respect to the scope of the invention. It is therefore contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of seismic surveying, comprising:
   deploying a plurality of water vehicles in a region for surveying, wherein:
   the water vehicles comprise a plurality of autonomous or remotely controlled vehicles,
   at least one of such vehicles being a propelled vehicle that comprises a surface float, a tether connecting the surface float and a submerged swimmer that has one or more fins that interact with the water as the swimmer moves up and down in response to wave motion to generate forces that propel the vehicle forward,
   the propelled vehicle comprises an onboard positioning system selected from the group consisting of a GPS system, a short base line acoustic positioning system, and a compass positioning system, and
   the onboard positioning system is configured to position or determine streamer shape or location relative to the propelled vehicle; and
   coupling a streamer to the propelled vehicle and further coupling additional distinct streamers to respective additional water vehicles of the plurality of water vehicles, the streamers each having a sensor for recording seismic data.

2. A method according to claim 1, further comprising deploying a source to generate seismic signals, the source being coupled to one of the water vehicles.

3. A method according to claim 1, wherein the water vehicles include one or more surface vehicles having streamers respectively coupled thereto, and further comprising deploying the streamer in a generally vertical direction through the water column.

4. A method according to claim 1, wherein the water vehicles include one or more underwater vehicles having streamers coupled thereto, and further comprising towing the streamers coupled to the underwater vehicles in a generally horizontal direction through the water column.

5. A method according to claim 1, wherein the water vehicles include one or more surface vehicles having streamers respectively coupled thereto, and further comprising deploying the streamer in a generally horizontal direction through the water column.

6. A method according to claim 1, wherein the water vehicles include one or more underwater vehicles having streamers respectively coupled thereto, and further comprising towing the streamers coupled to the underwater vehicles in a generally vertical direction through the water column.

7. A method according to claim 1, wherein the onboard positioning system comprises the GPS system.

8. A method according to claim 1, wherein the onboard positioning system comprises the short line acoustic positioning system.

9. A method according to claim 1, wherein the onboard positioning system comprises the compass positioning system.

10. A method of seismic surveying, comprising:
    towing one or more seismic streamers with a tow vessel, the one or more seismic streamers having seismic sensors coupled thereto for recording seismic data;
    deploying one or more water vehicles in an area generally proximate to the seismic streamers, the water vehicles comprising one or more autonomous or remotely controlled vehicles comprising:
- a surface float,
- a tether connecting the surface float,
- a submerged swimmer that has one or more fins that interact with the water as the swimmer moves up and down in response to wave motion to generate forces that propel the vehicle forward,
- a streamer coupled to the water vehicle, and
- an onboard positioning system selected from the group consisting of a GPS system, a short base line acoustic positioning system, and a compass positioning system, the onboard positioning system being configured to position or determine streamer shape or location relative to the propelled vehicle; and using the water vehicles to support the seismic survey.

11. A method according to claim 10, wherein using the water vehicles to support the seismic survey comprises using the water vehicles to measure current in the survey region.

12. A method according to claim 11, further comprising transmitting the measured current to the tow vessel.

13. A method according to claim 10, wherein using the water vehicles to support the seismic survey comprises using the water vehicles to position the one or more streamers.

14. A method according to claim 13, further comprising using the water vehicles to record acoustic signals transmitted from the streamers, and further transmitting such acoustic signals to the tow vessel.

15. A method of seismic surveying, comprising:
- deploying one or more water vehicles in a seismic survey area, the water vehicles comprising one or more autonomous or remotely controlled vehicles comprising:
  - a surface float,
  - a tether connecting the surface float,
  - a submerged swimmer that has one or more fins that interact with the water as the swimmer moves up and down in response to wave motion to generate forces that propel the vehicle forward,
  - a streamer coupled to the water vehicle, and
  - an onboard positioning system selected from the group consisting of a GPS system, a short base line acoustic positioning system, and a compass positioning system, the onboard positioning system being configured to position or determine streamer shape or location relative to the propelled vehicle;
- deploying one or more source vessels in the seismic survey area, the source vessel having one or more sources coupled thereto;
- advancing the water vehicles along a predetermined path;
- advancing the source vessel along a predetermined path;
- emitting acoustic signals from the one or more sources to generate seismic data; and
- recording the seismic data via the seismic sensors coupled to the water vehicles.

16. A method according to claim 15, wherein the water vehicles advance along a substantially linear path and the source vessel advances along a path substantially perpendicular to the path of the water vehicles.

17. A method according to claim 15, wherein the water vehicles advance along a substantially linear path and the source vessel advances along a path substantially parallel to the path of the water vehicles.

18. A method according to claim 15, wherein the water vehicles advance along a substantially linear path and the source vessel advances along a path substantially transverse to the path of the water vehicles.

19. A method according to claim 15, wherein the water vehicles advance along a substantially linear path and the source vessel advances along a substantially circular or elliptical path in the survey area.

20. A method according to claim 15, wherein the water vehicles advance at a first velocity and the source vessel advances at a second velocity, the first velocity being less than the second velocity.

21. A method according to claim 15, wherein the streamer includes seismic sensors disposed therein.

\* \* \* \* \*